United States Patent [19]

Tanaka et al.

[11] Patent Number: 4,791,515
[45] Date of Patent: Dec. 13, 1988

[54] PROTECTING A DISC CARTRIDGE FROM INADVERTENT ACTUATION DURING NONUSE

[75] Inventors: Kimio Tanaka; Haruo Shiba, both of Nagano, Japan

[73] Assignee: TDK Corporation, Japan

[21] Appl. No.: 39,676

[22] Filed: Apr. 16, 1987

[30] Foreign Application Priority Data

Apr. 17, 1986 [JP] Japan ............................. 61-56797[U]

[51] Int. Cl.$^4$ ...................... G11B 23/03; G11B 19/00; G11B 5/82
[52] U.S. Cl. .................................... 360/133; 369/291; 360/135
[58] Field of Search ................... 360/133, 97, 98, 135; 206/444; 369/291, 77.2, 258, 270

[56] References Cited

U.S. PATENT DOCUMENTS

| | | | |
|---|---|---|---|
| 3,416,150 | 12/1968 | Lindberg | 360/133 |
| 3,529,301 | 9/1970 | Hiruta | 360/133 |
| 4,399,480 | 8/1983 | Edwards | 360/133 |
| 4,688,127 | 8/1987 | Oishi et al. | 360/133 |
| 4,692,831 | 9/1987 | Suzuki | 360/133 |

FOREIGN PATENT DOCUMENTS 137965 4/1985 European Pat. Off. ............ 360/133
2537320 6/1984 France ................................ 369/291
58-212665 12/1983 Japan ................................ 360/133
60-50680 3/1985 Japan ................................ 360/133

Primary Examiner—John H. Wolff
Assistant Examiner—Matthew J. Bussan
Attorney, Agent, or Firm—Steinberg & Raskin

[57] ABSTRACT

A disc cartridge capable of effectively preventing opening of a shutter and damage of a disc therewithin, even when any unexpected shock is suddenly applied to the disc cartridge during non-use of the disc cartridge. The disc cartridge includes a connection mechanism for operatively connecting each of the actuators for releasably locking the shutter, to each of disc receivers, and which is constituted by a guide groove provided in the actuator and formed into a substantially sideways U-shape, and a guide pin provided on the disc receiver and movably positioned in the guide groove. The guide groove is formed with a depression at a distal end of a surface thereof, opposite to the guide pin and toward a forward side of the actuating direction of the actuator, the depression enlarging the guide groove to locate the surface thereof outside of a locus of pivotal movement of the guide pin during non-use of the disc cartridge, and carrying out delayed actuation with respect to the actuator at the time of starting of the disc cartridge.

12 Claims, 5 Drawing Sheets

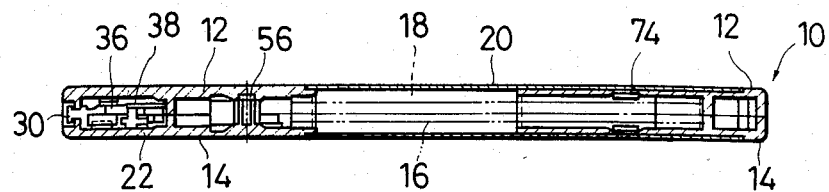
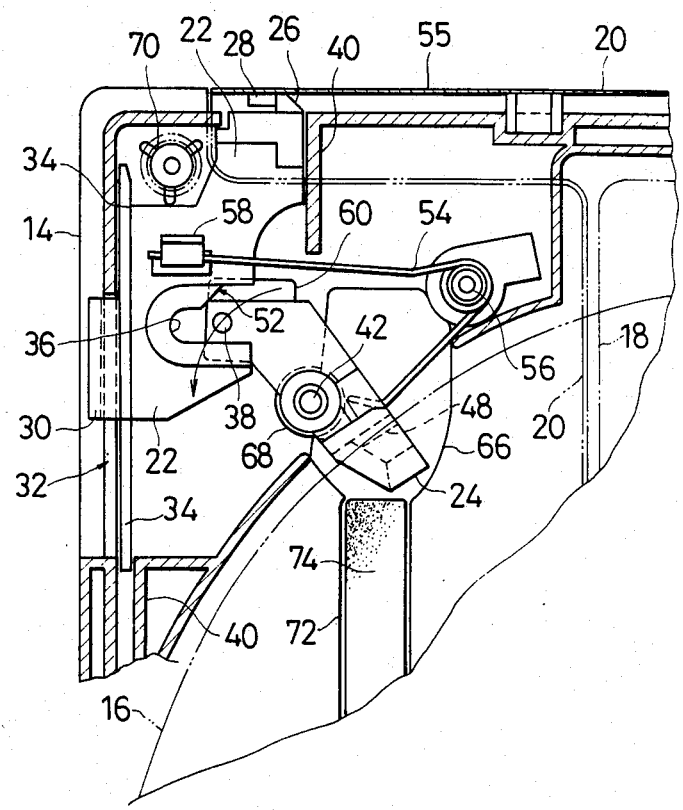

PROTECTING A DISC CARTRIDGE FROM INADVERTENT ACTUATION DURING NONUSE

BACKGROUND OF THE INVENTION

The present invention relates to a disc cartridge, and more particularly to a disc cartridge having a hard disc, especially a double-sided type housed in a casing.

In general, a disc-type data recording carrier such as a compact disc (CD), a video disc (LD) or the like is used in a manner by being removed from a packing case and then set in a recording and/or reproducing equipment such as a disc player.

Conventionally, it has been highly desirable to protect such a disc-type recording carrier from the environment because it is not only easily covered with dust or the like and damaged, but adversely affected due to variation in temperature. For this purpose, a disc cartridge has been proposed which is adapted to house or receive a disc in an envelope such as a tray, a case, or the like, to accomplish protection of the disc. Such an envelope is constructed so that a shutter for actuating a window through which a disc driving element of a disc player such as a disc head is inserted into the envelope, is opened when a disc is to be operated and closed during nonuse of the disc cartridge.

However, in the conventional disc cartridge, a disc receiver operatively connected to an actuator or shutter lock member for releasably locking the shutter, is suddenly actuated due to vibration or the like during non-use, causing the disc to be released from the disc receiver and resulting in the disc being damaged. Also, when any unexpected shock is applied to the envelope due to dropping or the like during non-use of the disc cartridge, the shutter is often suddenly opened, so that functioning of the envelope deteriorates to a degree sufficient to cause it to become unserviceable.

More particularly, when the disc cartridge is unexpectedly subject to shock during non-use due to dropping or the like, the weight of the disc overcomes a bearing capacity of the disc receiver to actuate the disc receiver which then actuates the actuator or shutter lock member and leads to releasing of the shutter from the shutter lock member so that the window is opened, causing dust and the like to readily enter into the disc cartridge therethrough. Unfortunately, the conventional disc cartridge lacks an effective manner of eliminating such a problem except by manual closing of the shutter. However, the manual closing renders handling of the disc cartridge highly troublesome, and deteriorates quality of the disc cartridge leading to failure in reliability of the disc cartridge.

Accordingly, it would be highly desirable to develop a disc cartridge which is capable of positively preventing releasing of a disc from a disc receiver and opening of a shutter due to vibration, shock, or the like unexpectedly applied to the disc cartridge during non-use of the disc cartridge, as well as keeping the disc in a state of floating in a casing to prevent contact of a recording surface of the disc with an inner surface of the casing during the non-use, so that satisfactory and reliable operation of the disc cartridge may be assured for a long period of time.

SUMMARY OF THE INVENTION

Accordingly, it is an object of the present invention to provide a disc cartridge which is capable of ensuring operation with high reliability for a long period of time.

It is another object of the present invention to provide a disc cartridge which is capable of effectively preventing dust or the like from entering the disc cartridge during non-use of the disc cartridge.

It is a further object of the present invention to provide a disc cartridge which is capable of ensuring safe operation of a disc without adversely affecting a recording surface section of the disc.

It is still another object of the present invention to provide a disc cartridge which is capable of positively preventing a shutter from being suddenly actuated to open a window due to any unexpected shock applied to the disc cartridge during non-use of the disc cartridge.

It is yet another object of the present invention to provide a disc cartridge which is capable of safely supporting a disc in a casing through a nonrecording surface section of the disc without applying excessive or nonuniform force thereto.

It is still a further object of the present invention to provide a disc cartridge which is capable of accomplishing the above-noted objects with simple structure.

Still other objects and advantages of the present invention will become apparent from the following description below.

These and other objects are attained by the present invention which is directed to a disc cartridge including a casing comprising an upper cover plate and a lower cover plate joined together to define space therein, in which a disc is rotatably housed. The disc cartridge also includes a shutter for operating at least a window formed in the casing for insertion of a disc driving element of a disc player such as a disc head therethrough and into the casing, and a pair of actuators arranged in the case. At least one of the actuators acts as shutter lock element for releasably locking the shutter.

Additionally, the disc cartridge includes a pair of disc receivers, each disc receiver operatively connected to a respective actuator in the casing and selectively receiving a part of a peripheral portion of the disc to retain the disc in a substantially central position within the casing in a thickness direction of the casing, or in a floating state within the casing. The operative connection or engagement between each of the actuators and the corresponding disc receiver is carried out by means of connection means which comprise a guide groove provided in one of the actuator or disc receiver, and a guide pin provided on the other of the actuator or disc receiver and movably fitted within the guide groove. The guide groove is formed with a depression at a distal end of a surface thereof opposite to the guide pin on a forward side of an actuating direction of the actuator. The depression enlarges the guide groove for positioning the surface of the guide groove outside of a locus of pivotal movement of the guide pin during non-use of the disc cartridge, and carries out delayed actuation of the disc receiver with respect to the actuator at the time of starting the disc cartridge. Furthermore, the disc cartridge includes elastic means for forcing the actuator and disc receiver towards a forward side of the actuating direction of the actuator, and a position regulating element for stopping movement of the disc receiver during non-use of the disc cartridge.

BRIEF DESCRIPTION OF THE DRAWINGS

For a fuller understanding of the invention, reference is made to the following description taken in conjunction with the accompanying drawings in which like reference numerals designate like or corresponding parts throughout, wherein

FIG. 2 is a vertical sectional view along line II—II of FIG. 1;

FIG. 3 is an enlarged, fragmentary plan view illustrating an actuating section of the disc cartridge illustrated in FIG. 1;

DESCRIPTION OF THE PREFERRED EMBODIMENTS

A disc cartridge according to the present invention will now be described below with reference to the accompanying drawings.

Figure 1:
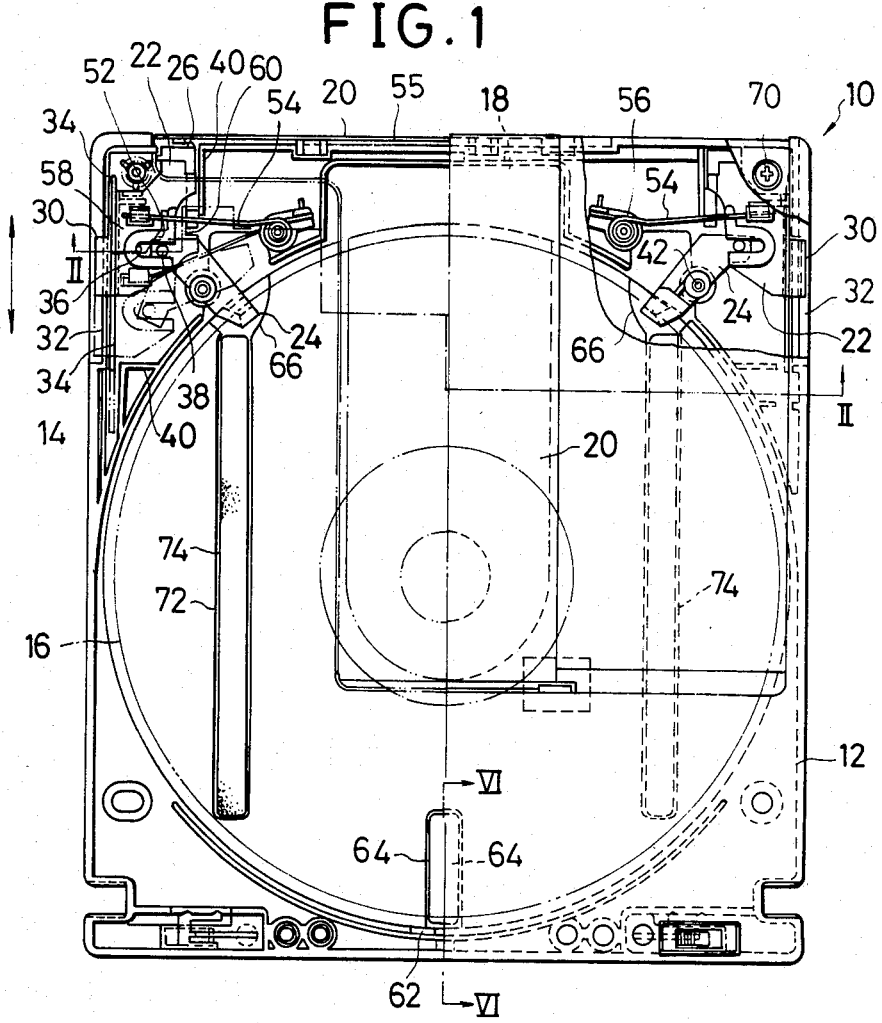
FIG. 1 is a plan view, partially cutaway, illustrating an embodiment of a disc cartridge according to the present invention.

FIG. 1 generally illustrates an embodiment of a disc cartridge according to the present invention.

A disc cartridge as illustrated in FIGS. 1-3, includes a casing 10 comprising an upper cover plate 12 and a lower cover plate 14 joined together, so as to define a space in the casing, with a disc 16 rotatably received or housed in the casing 10. The casing 10 is formed with an opening 18 at least in one of the upper and lower cover plates 12 and 14, which defines a window for inserting a disc driving element of a disc player (not illustrated) such as a disc head therethrough, into the casing 10. The window 18 is operated by a shutter 20. Also, the disc cartridge includes a pair of actuators 22 arranged in the casing 10. At least one of the actuators 22 also acts as a shutter lock element for releasably locking the shutter 20. In the illustrated embodiment, the actuator 22 arranged on a left side in FIG. 1 serves as the shutter lock means or element.

Also, a pair of disc receivers 24 are arranged in the casing 10 and are operatively connected to or engaged with the actuators 22 to actuate the corresponding disc receivers 24 respectively. The disc receivers 24 are each adapted to selectively receive therein a part of a peripheral portion of the disc 16 or a part of the peripheral end and upper and lower surfaces of the disc 16, and lift the disc as further described below.

Figure 7:
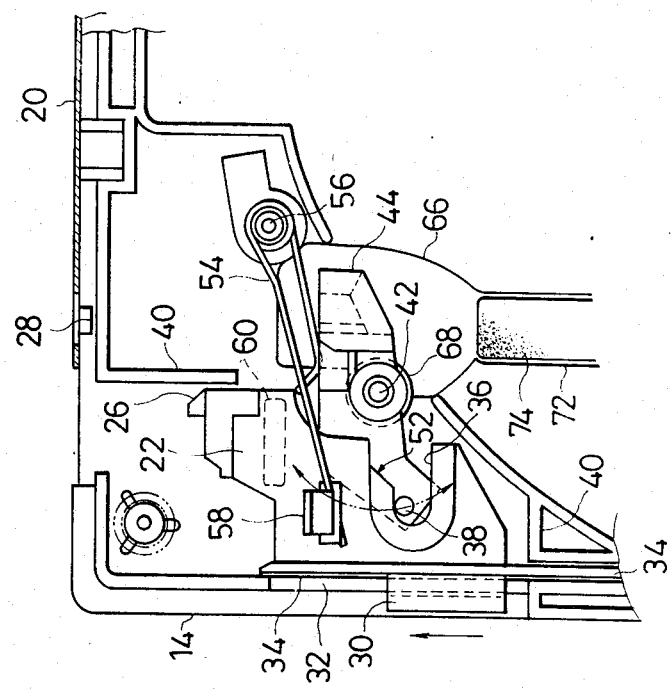
FIGS. 7 and 8 are each fragmentary enlarged plan views illustrating operation of the disc cartridge illustrated in FIG. 1.
Figure 8:
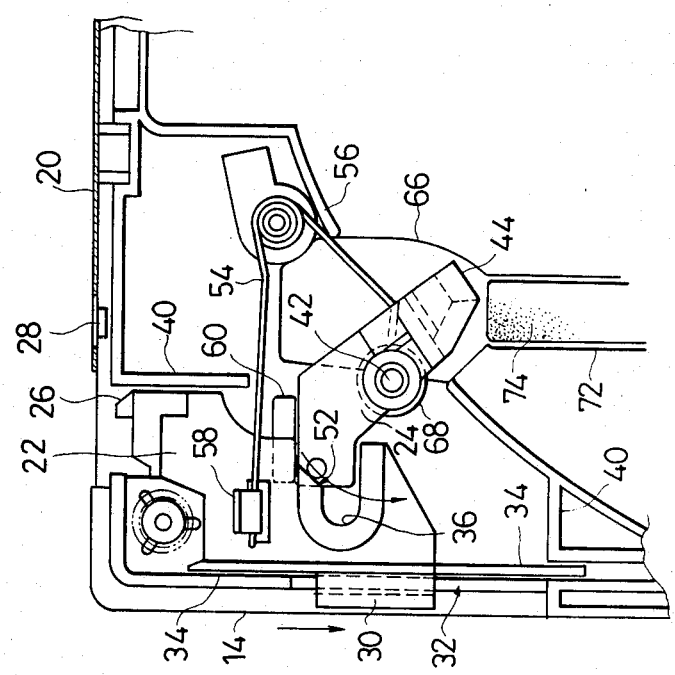

The actuator 22 is arranged in a slidable manner in a longitudinal direction of the cartridge, as indicated by arrows in FIGS. 1, 7 and 8. The disc receiver 24 is adapted to approachably move with respect to the disc 16, when the actuator 22 is slidably moved. Thus, when the shutter 20 is actuated to close the window 18, the disc receiver 24 may be engaged with the disc 16 or insert a part of the peripheral portion of the disc therein to force the disc towards a rear end of the casing 10 while retaining the disc 16 at a central position of the casing 10 in a thickness direction of the casing, to thereby keep the disc 16 in a state of "floating" within the space defined in the casing 10. When the shutter 20 is actuated to open the window 18, the disc receiver 24 may be disengaged from the disc 16 to prepare the disc 16 for engagement with the disc driving element of the disc player which is then inserted through the opened window 18 into the disc cartridge.

The shutter 20 comprises a plate member in a substantially U-shape which is movably fitted on the casing 10 so as to be slidable along the upper and lower cover plates 12 and 14 in a lateral direction of the casing 10.

A pair of the actuators 22 as shown in FIG. 1 are formed to symmetric and arranged adjacent to both sides of a front portion of the casing 10 in a manner not only opposite to one another, but also symmetric along a longitudinal axis of the casing and slidable with respect to the casing 10. Also, the actuators 22 each serve as an actuating lever.

for actuating operation sections of the disc cartridge. More particularly, the left one of the actuators 22 as illustrated in FIGS. 1 and 3 is provided at a front end thereof with lock means 26 comprising in the illustrated embodiment, a hook-like member integrally formed at a front end of the actuator 22 and securely engaged with the shutter 20 for locking the shutter 20. In the illustrated embodiment, the shutter 20 is engaged with the lock means 26 of the actuator 22 through a tongue-like projection 28 (FIG. 3) provided on a front end of the shutter 20.

Each of the actuators 22 is also provided on one side or on an outer side thereof with actuating means or element 30 which comprises, in the illustrated embodiment, a projection integrally formed on the outer side of the actuator 22 and outwardly extending through a horizontally-extending cutout or slot 32 formed in a side wall of the casing 10. Additionally, the actuator 22 comprises cover means 34 integrally mounted on one side or the outer side thereof so as to extend in a longitudinal direction thereof. The cover means 34 are formed to thoroughly cover the slot 32 formed in the side wall of the casing 10 in a sealed manner, and to function as a protective dust cover for preventing any dust from entering into the casing 10 through the slot 32. The actuator 22 is provided at the other side or an inner side thereof with a guide groove 36 which is formed into a substantially U-shape sideways, as illustrated in FIG. 3 in particular. A guide pin 38 is positioned in the guide groove 36 and is provided at one end of disc receiver 24 adjacent to and opposite the guide groove 36.

In the illustrated embodiment, the guide groove 36 is provided in the actuator 22 and the guide pin 38 is provided on the disc receiver 24 respectively. Alternatively, the actuator 22 may be provided with the guide pin 38, while the disc receiver 24 may be provided with the guide groove 36 respectively. The guide groove 36 and guide pin 38 cooperate together, to constitute connection means or mechanism for operatively connecting or engaging the actuator 22 to or with the disc receiver 24, which will be described in greater detail below.

A pair of the so-constructed actuators 22 may each be arranged, between the side wall of the casing 10 and an inwardly projecting guide rib 40 formed on an inner surface of each of the cover plates 12 and 14, so as to be slidable in the casing in actuating directions of the actuator as indicated by arrows in FIGS. 1, 7 and 8. The guide ribs 40 are provided opposite to one another. Alternatively, each of the actuators 22 may be slidably fitted in recesses or the like formed on the inner surface of the casing 10.

Figure 4:
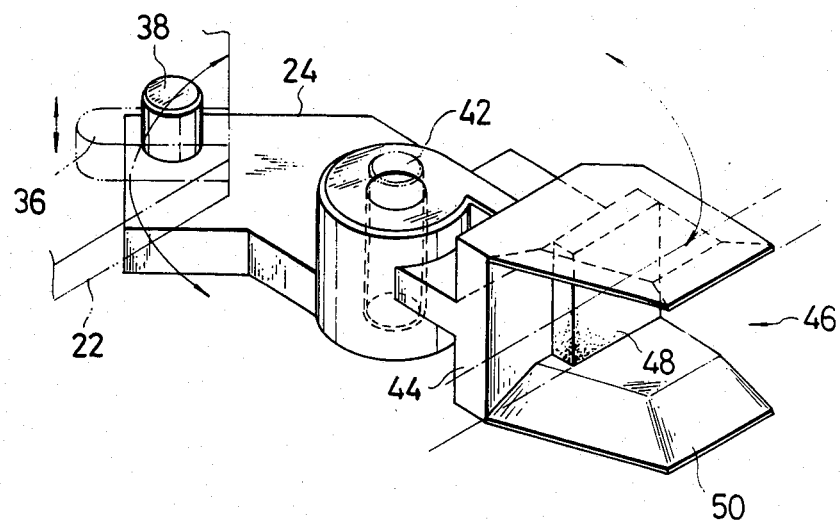
FIG. 4 is a perspective view illustrating a disc receiver of the invention.

A pair of the disc receivers 24 as illustrated in FIG. 1 are also formed in a substantially symmetrical manner. Each of the disc receivers 24 is generally formed into a lever-like shape as illustrated in FIGS. 1, 3 and 4 and movably fitted, at a middle portion thereof, on a pivot pin 42 securely supported between upper and lower surface sections of the inner surface of the casing 10, to allow the disc receiver to be pivotally mounted or moved about the pivot pin 42 as indicated by the arrows in FIG. 4 and vertically moved along the pivot pin 42. The guide pin 38 is provided at one end of the disc receiver 24 as described above.

Figure 5:
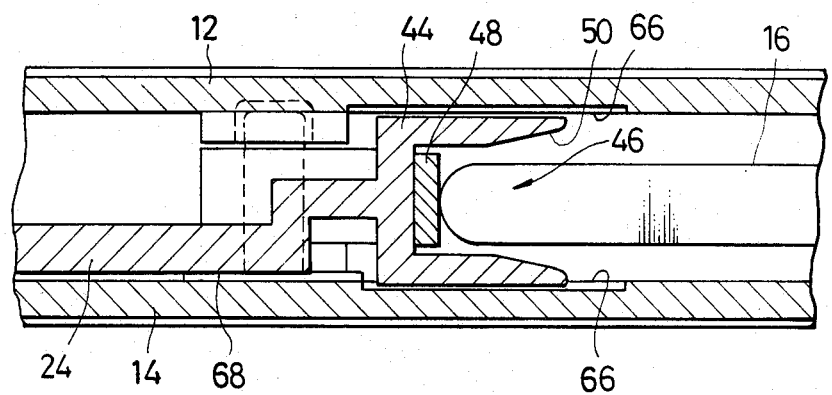
FIG. 5 is a fragmentary, vertical sectional view illustrating a receiver body of a disc receiver.

As illustrated in FIGS. 4 and 5, the disc receiver 24 is provided at the other end thereof with a receiver body 44 which is formed into a substantially U-shape sideways as illustrated in these figures, to define a recess therein designated by reference numeral 46. The recess 46 serves as both a disc holder for receiving a part of the peripheral portion of the disc 16 therein, and a disc lifter for lifting the disc 16 as required. The recess 46 is preferably provided on an end surface thereof contacting the peripheral end portion of the disc 16, with an elastic member 48 to prevent unsteadiness and/or damage of the disc 16 in the disc receiver 24. Such an elastic member may be arranged on upper and lower surfaces of the recess 46. The elastic member 48 may be formed of rubber or a soft plastic material such as polyethylene, polypropylene, vinyl chloride, or the like.

The recess 46 of the receiver body 44 is preferably formed in a manner such that its open end portion or inlet portion 50 is vertically enlarged so as to facilitate the insertion and removal of the disc 16 with respect to the recess 46. For example, the inlet portion 50 may have slanting or round surfaces.

The so-formed receiver bodies 44 are each positioned adjacent to the peripheral portion of the disc 16 to selectively receive a part of the peripheral portion in the recess 46 depending upon the sliding movement of the actuator 22.

The guide groove 36 of substantially sideways U-shape which cooperates with the guide pin 38 to constitute the connection means for operatively connecting or engaging each of the actuators 22 to or with the corresponding disc receiver 24, is formed with a depression 52 at a distal end of a surface thereof opposite to the guide pin 38 on a forward side of the actuating direction of the actuator 22, the depression 52 enlarging the guide groove 36 to a degree sufficient to cause any position on the surface to be located, during non-use of the disc cartridge, outside of a locus of pivotal movement of the guide pin 38 which is defined when the disc receiver 24 is pivotally moved about the pivot pin 42, as illustrated in FIG. 3. The depression 52 is preferably provided with an inclined side surface along or against which the guide pin 38 is guided or abuts when the disc cartridge is inserted in the disc player to actuate the actuator 22 as shown in FIG. 7.

The disc cartridge also includes elastic means 54 for constantly forcing each of the actuators 22 toward the forward side of the actuating direction of the actuator or to a front end 55 of the casing 10. The elastic means 54 also force the corresponding disc receivers 24 toward the same direction. In the illustrated embodiment, the elastic means 54 comprise a substantantially V-shaped spring held at a base portion thereof on a spring holder 56 fixed on the inner surface of the casing 10. The substantially V-shaped spring 54 is engaged at one end thereof with the actuator 22 through a spring bearing 58 provided on an upper surface of the actuator 22, and at the other end thereof with the disc receiver 24, so that the actuator 22 and disc receiver 24 may be forced towards the front end of the casing 10, and the guide pin 38 may be constantly positioned within the guide groove 36.

In the illustrated embodiment, the other end of the spring 54 is engaged with the middle portion of the disc receiver 24 which is fittted on the pivot pin 42. As described above, the substantially V-shaped spring is used as the elastic means in the illustrated embodiment. However, the elastic means 54 may comprise a coiled spring stretchedly arranged in the sliding direction of the actuator 22 or between the disc receiver 24 operatively connected to the actuator 22 and the casing 10. Alternatively, the elastic means 54 may comprise a coiled spring wound on the pivot pin 42 of the disc receiver 24. Each of such arrangements causes the spring to not only constantly force the actuator 22 and disc receiver 24 toward the front end 55 of the casing 10, but also positions the guide pin 38 in the guide groove 36.

Pivotal movement of the disc receiver 24, forced by the spring 54 during non-use of the disc cartridge as described above, is stopped by a position regulating element 60 provided in the casing 10. More particularly, the disc receiver 24 abuts, at a side surface thereof against the position regulating element 60, to thereby be positionally regulated during non-use. Thus, it is noted that the position regulating element 60 retains the guide pin 38 of the disc receiver 24 forced by the spring 54, in a state of noncontact with the surface of the guide groove 36, during the non-use of the disc cartridge. In the illustrated embodiment, the position regulating element 60 comprises a rib provided on a lower surface section of the inner of the casing 10, so as to inwardly project therefrom. The rib is preferably formed to have a height equal to or smaller than a thickness of the disc receiver 24. However, the rib may comprise any other suitable means such as a projection or the like, so long as it abuts against the side surface of the disc receiver 24 to stop movement of the disc receiver 24.

Figure 6:
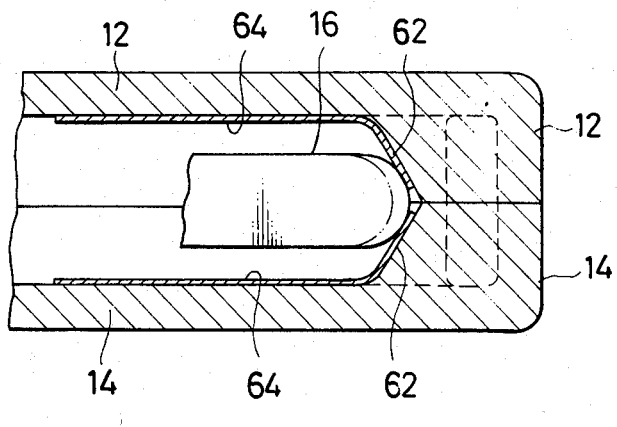
FIG. 6 is a vertical sectional view along line VI—VI of FIG. 1.

Furthermore, in the illustrated embodiment at least a portion of a peripheral end of the inner surface of the case 10, particularly a rear end surface 62 thereof as shown in FIG. 6, may be formed into a substantially sideways V-shape, so that the rear end surface 62 may be tapered. Such a construction facilitates positioning of the disc 16 at the center of the casing 10 in a thickness direction of the casing, because the disc is guided along the tapered inner end surface 62. This results in the disc 16 being located at positions indicated by two dash-dot and solid lines in FIG. 6 when the disc cartridge is charged into the disc player and removed therefrom, respectively. A disc holding member 64 of a sheet-like shape may be applied to the tapered rear end surface 62, to ensure safety and smooth operation of the disc in the casing 10. For this purpose, the disc holding member 64 is preferably formed of a material which is capable of exhibiting lubricating properties, such as ultra-high-molecular-weight polyethylene, ultra-high-molecular-weight polyethylene foam, polyethylene terephthalate (PET), stainless steel, and the like. Such a member may be likewise applied to portions of the inner surface of the casing 10 adjacent to the tapered rear end surface 62 as shown in FIG. 6.

The casing 10 as shown in FIG. 1 is formed with a pair of recesses 66 on each of the upper and lower sections of the inner surface thereof, so as to positionally correspond with the disc receivers 24. The recesses 66 each serve to ensure smooth pivotal movement of the disc receiver 24 in the casing 10. Reference numeral 68 designates a base for supporting the disc receiver 24 thereon.

Reference numeral 70 designates bolts, reference numeral 72 indicates recesses formed on the inner surface of the casing 10, while reference numeral 74 denotes lubricating, self-adhesive sheets received in the recesses 72 respectively. Each of the sheets 74 is preferably positioned so as to abut against a non-recording surface section of the disc 16 such as a peripheral section thereof, a central section thereof, or the like, and arranged in the corresponding recess 72 in a manner to project somewhat from the inner surface of the casing. In the illustrated embodiment, each of the cover plates 12 and 14 is provided with two such disc holding sheets 74, so as to positionally correspond to a substantially peripheral section of the disc 16 in a substantially symmetrical manner, so that the disc 16 may be uniformly and safely supported thereon.

The manner of operation of the disc cartridge of the illustrated embodiment constructed as described above, will now be described below with reference to FIGS. 1-8.

When the disc cartridge is inserted into a disc player (not illustrated) for operation, the actuating means or projection 30 of the actuator 22 outwardly projecting through the slot 32 of each of the side walls of the casing 10, is engaged with a projection provided at an insertion port of the disc player and is rearwardly slidedly moved along the slot 32 against the elastic means or substantially V-shaped spring 54. Such sliding of the projection 30 causes the tongue-like projection 28 of the shutter 20 to be disengaged from the lock means or hook-like member 26 of the actuator 22, so that the shutter 20 may be moved in a direction of opening the window 18 or in a rightward direction in FIG. 1, by means of a shutter actuating mechanism (not illustrated) of the disc player. Concurrently, the disc receiver 24 is pivotally moved about the pivot pin 42 through engagement between the guide groove 36 and the guide pin 38 due to sliding of the actuator 22 from a position shown in FIG. 3, through a position shown in FIG. 7, and to a position shown in FIG. 8, thereby releasing the disc 16 from the recess 46 of the receiver body 44. This results in the disc 16 being safely supported on lubricating, self-adhesive sheets 74 provided on the inner surface of the casing 10, and then operatively engaged with a disc driving element (not shown) of the disc player.

Then, when the disc cartridge is to be removed from the disc player, the disc 16 is first disengaged from the disc driving element of the disc player in the casing 10, to be placed on the lubricating, self-adhesive sheets 74. This corresponds to the position shown in FIG. 8. Then, the shutter 20 is moved by means of the shutter actuating mechanism of the disc player to close the window 18, during which each of the actuators 22 is slid towards the front end 55 of the casing 10 by the spring 54. This results in the disc receiver 24 being pivotally moved about the pivot pin 42 in a clockwise direction in FIG. 8, to receive a part of the disc 16 in the recess 46. This corresponds to the position shown in FIG. 7.

The actuator 22 is further slid towards the front end 55 of the casing 10, to cause the disc receiver 24 to be further pivotally moved to the position shown in FIG. 3, so that the disc 16 may be forced to the rear end 62 of the casing 10 while being held in a state of floating within the casing as indicated by the solid lines in FIG. 6. This results in the disc abutting against the rear end surface 62, being securely and safely held within the casing. Simultaneously, the lock means 26 of the actuator 22 engages tongue-like projection 28 of the shutter 20, to keep the shutter 20 closed.

During non-use of tne disc cartridge, the disc receiver 24 is constantly forced towards the forward side of the actuating direction of the actuator 22 or toward the front end 55 of the casing 10, by means of the elastic means or substantially V-shaped spring 54, to thereby abut against the position regulating rib 60. This results in the disc receiver 24 being retained in the position illustrated in FIGS. 1 and 3. Also, the guide groove 36 of the actuator 22, in which the guide pin 38 of the disc receiver 24 is movably positioned, is formed with the depression 52 at the distal end of the surface opposite to the guide pin 38 on the forward side in the actuating direction of the actuator 22 or, in the illustrated embodiment, on the front end side 55 of the casing 10. This results in the guide groove 36 being enlarged at the inlet portion thereof to a degree sufficient to cause any position of the surface of the guide groove 36 to be located outside of a locus of pivotal movement of the guide pin 38. Such construction effectively prevents the guide pin 38 from contacting or abutting against the surface of the guide groove 36 during non-use of the disc cartridge, even when the disc receiver 24 is suddenly moved during the non-use, as shown in FIG. 3.

Accordingly, release of the disc 16 from the disc receiver 24, and opening of the shutter 20 during non-use, are effectively prevented. Also, such construction, when the actuator 22 is
started for the purpose of operation of the disc cartridge, causes pivotal movement of tne disc receiver 24 about the pivot pin 42 to be started later by a predetermined period of time, due to the depression 52 as shown in FIG. 7, because the surface of the guide groove 36 fails to abut against the guide pin 38 between the position of FIG. 3 and that of FIG. 7, during sliding movement of the actuator 22. Accordingly, even when any unexpected shock is applied through the disc cartridge to the actuator 22 at the time of starting the disc cartridge, the receiver 24 is prevented from being suddenly actuated, resulting in the disc 16 being safely retained. Also, the depression 52 does not hinder positive operation of the disc cartridge, because the disc receiver 24 is still effectively actuated by the actuator 22.

As can be seen from the foregoing, in the disc cartridge of the present invention, the guide groove is provided with the depression which prevents abutment of the guide pin against the guide groove during non-use of the sic cartridge, and causes each of the disc receivers to carry out the delayed actuation in relation to the corresponding actuator at the time of starting the disc cartridge. Also, the position regulating element retains the disc receiver in a state of being out of contact with the actuator, during non-use of the disc cartridge. Accordingly, the disc cartridge of the present invention positively prevents entrance of any foreign matter such as dust or the like into the casing, and damage of the disc during non-use of the disc cartridge, even when it is suddenly shocked. Also, the present invention effectively prevents damage of the disc due to any shock applied to the disc cartridge during the non-use and at the time of the starting tnereof.

It is thus seen that the objects set forth above, and those made apparent from the preceding description, are efficiently attained, and further that certain changes may be made in the above construction without departing from the spirit and scope of the invention. It is intended that all matter contained in the above description or shown in the accompanying drawings shall be interpreted for illustrative purposes only, and not in any limiting sense. For example, the present invention may operate with a different number of actuators 22 and a different number of disc receivers 24.

We claim:

1. A disc cartridge, comprising:

a casing comprising an upper cover plate and a lower cover plate joined together to define a space therewithin and having a front end at which said cartridge is inserted into a disc player;

a disc rotatably housed in said casing;

a shutter for operating at least one window provided in said casing for insertion of a disc driving element of the disc player therethrough into said casing, and for closing said window during non-use of said disc cartridge;

a pair of actuators arranged in said casing;

a shutte lock element for releasably locking said shutter, said shutter lock element comprising at least one of said actuators;

a pair of disc receivers, each arranged in said casing and operatively connected to one of said actuators to selectively receive a part of a peripheral portion of said disc to hold said disc at a substantially central position in said casing in a thickness direction of said casing, by pivotal movement of said disc receivers;

connection means for operatively connecting each of said actuators to the corresponding disc receiver;

said connection means comprising a guide groove provided in one of said actuator and corresponding disc receiver, and a guide pin provided on the other of said actuator and said corresponding disc receiver, said guide pin being positioned within said guide groove and being selectively engagable with said guide groove;

said actuator or disc receiver provided with said guide groove additionally being formed with a depression situated at a distall end of a surface of said guide groove on a side thereof toward the front end of the casing, said depression enlarging said guide groove to position said surface of said guide groove outside of a locus of pivotal movement of said guide pin during non-use of said disc cartridge, and to carry out delayed actuation of said disc receiver with respect to said actuator, at the time of starting of the disc cartridge;

elastic means for forcing said actuator and corresponding disc receiver toward said front end of said casing; and a position regulating element for stopping movement of said corresponding disc receiver during non-use of said disc cartridge.

2. The disc cartridge of claim 1, wherein said depression is provided with an inclined side surface with respect to a plane substantially perpendicular to the front end of the casing along which said guide pin is guided in said depression.

3. The disc cartridge of claim 1, wherein said guide pin is provided on said corresponding disc receiver, and said position regulating element retains said guide pin of said disc receiver forced by said elastic means out of contact with said guide groove during non-use of said disc cartridge.

4. The disc cartridge of claim 3, wherein said position regulating element comprises at least one rib provided on an inner surface of said casing.

5. The disc cartridge of claim 4, wherein said rib is formed with a height equal to or smaller than a thickness of said corresponding disc receiver, and said corresponding disc receiver abuts against said rib at a side surface thereof.

6. The disc cartridge of claim 1, wherein said guide groove is provided on said actuator and said guide pin is provided on saio corresponding disc receiver.

7. The disc cartridge of claim 6, wherein said guide pin is provided on one end of said corresponding disc receiver and said disc receiver comprises a pivot pin about which said disc receiver is pivotably mounted and moved by actuation of said actuator through said connection means.

8. The disc cartridge of claim 7, wherein said disc receiver is provided with a receiver body at the other end thereof with is approachably moved with respect to said peripheral portion of said disc for selectively receiving said disc therein when said disc receiver is pivotally moved about said pivot pin by actuation of said actuator through said guide pin.

9. The disc cartridge of claim 1, wherein said shutter lock element comprises lock means for locking said shutter when said shutter is actuated to close said window.

10. The disc cartridge of claim 1, wherein said actuator comprises an actuating member outwardly projecting from said casing, said actuator being actuated through said actuating member.

11. A disc cartridge of claim 1, wherein said elastic means comprise a substantially V-shaped spring mounted on said casing at a base portion thereof, one end of said spring engaged with said actuator and the other end engaged with said disc receiver.

12. The disc cartridge of claim 1, wherein said actuator is movably arranged between a side wall of said casing and guide ribs provided on upper and lower inner surface sections of an inner surface of said casing, so as to be inwardly projecting therefrom and opposite to one another.

* * * * *